United States Patent
Bolten et al.

(10) Patent No.: US 11,265,250 B2
(45) Date of Patent: Mar. 1, 2022

(54) TARGETED RATE LIMITING OF TENANT SYSTEMS IN ONLINE SERVICES

(71) Applicant: Adobe Inc., San Jose, CA (US)

(72) Inventors: Jan Bolten, Hamburg (DE); Gereon Frey, Hamburg (DE)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/913,431

(22) Filed: Jun. 26, 2020

(65) Prior Publication Data

US 2021/0409330 A1 Dec. 30, 2021

(51) Int. Cl.
*H04L 12/801* (2013.01)
*H04L 29/06* (2006.01)
*H04L 47/12* (2022.01)
*H04L 47/11* (2022.01)

(52) U.S. Cl.
CPC ............. *H04L 47/12* (2013.01); *H04L 47/11* (2013.01); *H04L 63/10* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 10,049,227 | B1 * | 8/2018 | Sampson | G06F 21/6218 |
| 10,318,727 | B2 * | 6/2019 | Kimura | G06F 21/554 |
| 2006/0126509 | A1 * | 6/2006 | Abi-Nassif | H04L 47/263 370/235 |
| 2014/0075012 | A1 * | 3/2014 | Peterson | H04L 47/22 709/224 |
| 2015/0229579 | A1 * | 8/2015 | Kosim-Satyaputra | H04L 67/02 709/225 |
| 2017/0149828 | A1 * | 5/2017 | Botti | H04L 63/08 |
| 2017/0324629 | A1 * | 11/2017 | Iyer | H04L 65/4092 |
| 2018/0248807 | A1 * | 8/2018 | Murphy | H04L 67/10 |
| 2018/0309686 | A1 * | 10/2018 | Roth | H04L 43/16 |
| 2018/0316702 | A1 * | 11/2018 | Gaspard | H04L 63/10 |
| 2019/0268271 | A1 * | 8/2019 | Mowforth | H04L 41/0826 |

(Continued)

OTHER PUBLICATIONS

Wikipedia, "Random Early Detection", https://en.wikipedia.org/wiki/Random_early_detection, Jun. 12, 2020, 4 pages.

(Continued)

*Primary Examiner* — Andre Tacdiran
(74) *Attorney, Agent, or Firm* — Kilpatrick Townsend & Stockton LLP

(57) ABSTRACT

This disclosure involves applying rate limits to violating tenant computing devices causing resource consumption violations at system components identified via violation evaluation processes. A system identifies a resource consumption violation with respect to a computing system hosting an online service. The system retrieves log data identifying tenant systems that accessed the memory resource during a particular time period in which the resource consumption violation impacted performance of the online service. The system determines, from the log data, that a violator tenant system accessing the online service caused the resource consumption violation. The system enforces a rate limit against the violator tenant system rather than other tenant systems identified in the log data.

20 Claims, 3 Drawing Sheets

(56) References Cited

U.S. PATENT DOCUMENTS

2020/0192706 A1* 6/2020 Huus .................. G06F 9/505
2021/0105317 A1* 4/2021 Kona .................. G06F 9/4881
2021/0157641 A1* 5/2021 Parsa .................. G06F 9/4881

OTHER PUBLICATIONS

Simpson, J., "Everything You Need to Know About API Rate Limiting", Nordic APIS Blog, https://nordicapis.com/everything-you-need-to-know-about-api-rate-limiting/, Apr. 18, 2019, 10 pages.
Tarjan, Paul, "Scaling Your API With Rate Limiters", Stripe, Blog, https://stripe.com/blog/rate-limiters, Mar. 30, 2017, 9 pages.
Degats, Julien, "How We Built Rate Limiting Capable of Scaling to Millions of Domains" The Cloudflare Blog, https://blog.cloudflare.com/counting-things-a-lot-of-different-things/, Jun. 7, 2017, 14 pages.
Google Cloud "Rate-Limiting Strategies and Techniques", https://cloud.google.com/solutions/rate-limiting-strategies-techniques, Jun. 22, 2020, 13 pages.

* cited by examiner

200

210
Identifying a resource consumption violation with respect to a system component of a host computing system

220
Retrieving log data identifying tenant systems that accessed the memory resource during a particular time period

230
Determining, from the log data, that a violating tenant system accessing the online service caused the resource consumption violation

240
Enforcing a rate limit against the violating tenant system rather than other tenant systems identified in the log data, wherein the rate limit reduces an ability of the violating tenant system to access the online service

*Fig. 2*

TARGETED RATE LIMITING OF TENANT SYSTEMS IN ONLINE SERVICES

TECHNICAL FIELD

This disclosure generally relates to detecting and correcting degradations in performance in distributed computing systems, such as (but not limited to) multi-tenant applications in a cloud-based service. More specifically, but not by way of limitation, this disclosure relates to targeted rate limiting of tenant systems causing resource-consumption issues or other suboptimal system component statuses in online services.

BACKGROUND

Computing systems that host online services could suffer decreased performance because of excessive requests by tenants. For instance, harmful request patterns by user computing devices, service computing devices, service client applications, or other tenants could deplete the resource capacity of a cloud computing system through harmful request patterns to a service hosted by the cloud computing system. A harmful request pattern could include an excessive number of requests, a request for an excessive amount of data, etc. Examples of this resource capacity include a service usage quota for tenants, a minimum upload or download speed for tenants, a response rate for requests from tenants.

One approach for addressing these decreases in performance is to enforce rate limits against tenants, thereby preserving a resource capacity of a host computing system's infrastructure. For instance, enforcing rate limits could include restricting the number of requests from tenants over a specified time period that a host computing system will service. To do so, host computing systems often apply rate limits universally across tenants or universally across classes of tenants.

SUMMARY

Certain embodiments involve targeted rate limiting of tenant systems causing resource-consumption issues or other suboptimal system component statuses in online services. For example, a computing system identifies a resource consumption violation with respect to a system hosting an online service. The resource consumption violation decreases responsiveness of the online service during a particular time period. The computing system retrieves log data identifying tenant systems that accessed the memory resource during the particular time period and determines, from the log data, that a violator tenant system accessing the online service caused the resource consumption violation. The computing system enforces a rate limit against the violator tenant system identified from the log data. The rate limit reduces an ability of the violator tenant system to access the online service.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts an example of a method for applying a rate limit to a tenant system impacting a status of a system component of an online service, according to certain embodiments described in the present disclosure.

DETAILED DESCRIPTION

Figure 1:
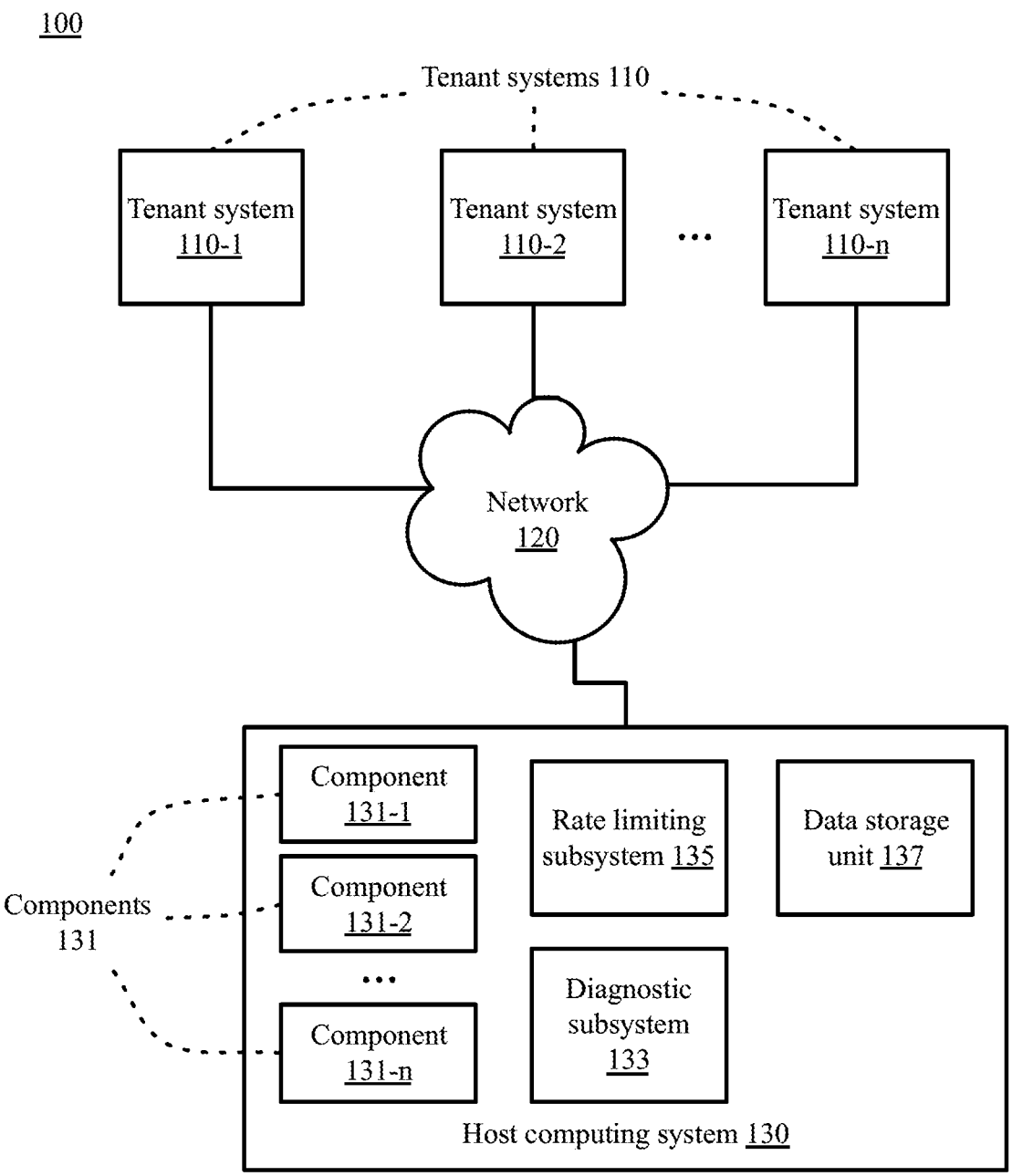
FIG. 1 depicts an example of a computing environment for applying a rate limit to a tenant system impacting a status of a system component of an online service, according to certain embodiments described in the present disclosure.

The present disclosure involves targeted rate limiting of tenant systems causing resource-consumption issues or other suboptimal system component statuses in online services. For instance, as explained above, conventional techniques involve applying rate limits universally across tenants or universally across classes of tenants, without regard to the impact of a given tenant's requests to back-end memory resources or other system components. However, these techniques could throttle non-threating requests, such as tenant requests that would not strain the online service's capacity, thereby degrading the performance of an online service for all tenants even if only a few tenants are causing resource-consumption issues. Additionally or alternatively, trying to maintain the performance of the online service for all tenants while universally applying rate limiting could lead to rate-limiting operations that are insufficiently aggressive to address harmful request patterns. Certain embodiments described herein can avoid one or more of these problems by, for example, identifying one or more particular tenant systems that have caused a suboptimal status of a system component and targeting a rate-limiting operation to the particular tenant system. Targeting a rate-limiting operation to the particular tenant system can allow for an aggressive rate-limiting operation to be applied selectively, such that harmful request patterns are diminished while service performance for other tenants with non-threatening requests is restored or otherwise not degraded.

The following non-limiting example is provided to introduce certain embodiments. In this example, a host computing system provides online services (e.g., a media streaming service, a search engine, or an electronic messaging service) to tenant systems. A tenant system could be a computing device, a server, an application, or other entity that is a client of the host computing system to which the host computing system provides services via a network. In this example, the host computing system includes a diagnostic system for detecting issues that may degrade the performance of an online service provided by the host computing system. For instance, the diagnostic system identifies a resource consumption violation with respect to a system component, such as a database shard or other memory resource. Examples of system components include data structures, computing devices, applications, physical or virtual storage units, etc. The resource consumption violation results in a suboptimal status of one or more system components, in that a reduced resource capacity of the host computing system decreases responsiveness of the online service during a particular time period. One example of a suboptimal status is an overutilization of resources, such as saturation of a database shard. Another example of suboptimal status is a failure to meet a performance metric (e.g., a request rate, a storage limit, a thread limit, a call volume limit, etc.).

Continuing with this example, the diagnostic subsystem performs a violation evaluation process to identify a tenant system that is causing or contributing to the resource consumption violation at the affected system component. A violation evaluation process could include analyzing log data for the affected system component and thereby determining which tenant system is associated with events that resulted in the suboptimal status. For example, the affected system component could be a database shard network and the suboptimal status could be a saturation of the network interface of a database shard. In a violation evaluation process, the diagnostic subsystem retrieves log data that identifies tenant systems that accessed the network interface of a database shard during a particular time period in which responsiveness of the online service was decreased. The diagnostic subsystem identifies, from the log data, a total number of queries and a total number of items returned over a time period. The diagnostic subsystem also identifies, from the log data, the tenant systems from which the queries originated or to which the items were returned. The diagnostic subsystem determines that a particular tenant system caused the saturation of the network interface of a database shard due to the tenant system having a larger contribution to the total number of queries or the total number of items returned (e.g., the largest number of queries or returned items, a threshold number of queries or returned items, etc.). The diagnostic subsystem classifies the particular tenant system as a violator tenant system as a result of this violation evaluation process.

Continuing with this example, the host computing system determines a rate limit to apply against the violator tenant system. The host computing system enforces a determined rate limit against the violator tenant system by, for example, throttling or blocking access to system components or services, while allowing access by other tenant systems to proceed without the rate limit being enforced. For instance, the host computing system could reduce the upload or download speed for a violator tenant system, reject requests from a violator tenant system for a certain time period, or some combination thereof.

The diagnostic subsystem can provide feedback to the host computing system with respect to the effect of the rate limit. For instance, after the host computing system has enforced the rate limit against a violator tenant system for a certain time period, the diagnostic subsystem can determine whether the responsiveness of the online service has improved or returned to normal during a subsequent time period. If the responsiveness has improved, then the diagnostic subsystem notifies the host computing system that the rate limit can be removed or decreased in severity. Otherwise, the diagnostic subsystem notifies the host computing system that the rate limit should be maintained or enforced more aggressively (e.g., by further reducing the upload or download speed for the violator tenant system).

In some embodiments, the host computing system enforces a rate limit for a length of time that is proportional to the impact on the affected system component, a history of resource consumption violations associated with the violator tenant system, or other relevant criteria. In additional or alternative embodiments, the host computing system permanently enforces the rate limit against the violator tenant system.

In some embodiments, the host computing system determines the rate limit based on a contribution to the suboptimal status of the system component by the violator tenant system, a history of resource-consumption violations associated with the violator tenant system, or other relevant criteria. For instance, the host computing system could enforce rate limiting more aggressively against violator tenant systems with larger contributions to the suboptimal status or more extensive histories of resource-consumption violations.

Certain embodiments provide improvements to computing systems by maintaining or improving a responsiveness of an online service. These improvements can be effected by applying appropriate violation evaluation processes to identify violator tenant systems that cause or contribute to a suboptimal status (e.g. a resource consumption violation) of a system component. For instance, overutilization of system components of host computing systems can decrease responsiveness of an online service. Examples of this responsiveness include the speed with which query results are returned, the delay between a user device invoking a function (e.g., selecting a function from a menu in a cloud-based application) and the function being performed for the requesting user device, the quality of playback for streaming media content, etc. The responsiveness of an online service can be improved by features described herein. For instance, the particular rate limiting techniques used herein can specifically target violator tenant systems contributing to resource consumption violations of system components affecting an overall computing system resource capacity. Thus, embodiments described herein utilize rate-limit targeting techniques to improve computing system performance. In some embodiments, these improvements can facilitate improvements to computing system environments (e.g., online services, electronic content services, automation systems, online services, etc.) by targeting rate limits to violator tenant systems rather than throttling requests from non-violator tenant systems, by using feedback to increase or decrease the severity of the rate-limit enforcement, or some combination thereof.

As used herein, the term "host computing system" is used to refer to a system that provides one or more services to tenant systems via a network, including processing requests received from tenant systems, receiving data from the tenant systems, transmitting data to the tenant systems, making data available for access by the tenant system, storing data for the tenant system, or other service directed to the tenant systems via the network.

As used herein, the term "host computing system" is used to refer to a computing system that supports an online service that provides services to tenant systems.

As used herein, the terms "system component" is used to refer to hardware devices, data structures, or software modules that are used by a host computing system to provide services to tenant systems. Examples of system components include databases, servers, computing devices, applications, physical storage devices, virtual storage units, or other components or one or more sub-devices or sub-components of databases, servers, computing devices, web applications, physical storage devices, virtual storage units.

As used herein, the term "resource consumption violation" describes a suboptimal status of a memory resource or other system component of a host computing system. An example of a suboptimal component status is exceeding or not meeting a threshold metric for a system component, for example, a request rate metric, a storage limit, a thread limit, a call volume limit, etc.

As used herein, the term "tenant system" is used to refer to a computing device, a server, an application, or other entity that is a client of the computing system to which the computing system provides services.

As used herein, the term "rate limit" is used to refer to a limit on a tenant system's access to one or more resources of an online service. Examples of enforcing a rate limit include restricting, throttling, and/or blocking access by the violating tenant to system components or computing system services such as uploading, downloading, storing, transmitting, receiving, retrieving, streaming, converting, or processing data, executing processes, providing user interface displays, access to an application, or other services of the computing system provided to a tenant system. In some embodiments, the rate limit includes a remedy, penalty, or other measure applied to a violator tenant system to address a suboptimal status of a particular system component or a particular resource consumption violation.

Example of an Operating Environment for Applying Rate Limits to Violator Tenant Systems Referring now to the drawings, FIG. 1 depicts an example of a computing environment 100 in which a host computing system applies rate limits to a tenant systems to tenant systems impacting statuses of system component of an online service, according to certain embodiments described in the present disclosure. In some embodiments, the computing environment 100 includes one or more tenant systems 110 (which include tenant systems 110-1 to 110-*n* depicted in FIG. 1) and a host computing system 130. The host computing system 130 executes one or more software modules that implement one or more online services (e.g., a web service). In this example, the host computing system 130 includes a set of components 131 (which include components 131-1 to 131-*n* depicted in FIG. 1), a diagnostic subsystem 133, a rate limiting subsystem 135. The host computing system also includes one or more data storage units 137.

In the example depicted in FIG. 1, one or more tenant systems 110 (e.g., tenant system 110-1 through 110-*n*) communicate with a host computing system 130 via a data network 120. In some embodiments, tenant systems 110 receive services from the host computing system 130. For instance, an online service provided by the host computing system 130 communicates data, stores data, processes one or more requests, or otherwise provides services to tenant systems 110.

The system components 131 are used to perform operations to support the host computing system 130. For instance, the system components 131 could include databases, servers, computing devices, applications, physical storage devices, virtual storage units, or other components or one or more subsystems used by the host computing system 130 to provide services to tenant systems 110.

The diagnostic subsystem 133 determines the status information or diagnostic information concerning one or more components 131 of the host computing system 130 by accessing data logs. In these examples, the data logs are accessible via the data storage unit 137 of the host computing system 130 or data storage units associated with particular system components 131. An example of a process performed by the diagnostic subsystem 133 to determine diagnostic information and/or status information of components 131 is described herein with respect to certain steps of FIG. 2.

Examples of diagnostic information include metrics describing a current operating status of a component 131 or an operating history of the component 131. The diagnostic information may include time stamp data that identifies when the system components 131 receive requests, transmit data, process requests, receive data, or otherwise communicate with the tenant systems 110 or other components 131 of the host computing system 130. Examples of diagnostic information include a processing speed, a number of requests processed over a time period, a current number of requests being processed, a number of requests in a queue waiting to be processed, an amount of data transmitted or received over a time period, a current storage capacity, an amount of data stored, an upload speed, a download speed, or other diagnostic information. Other examples of diagnostic information may include tenant system 110 specific data at particular time points, for example, logged time stamp data that records when the components transmit data, process requests, receive data, or communicate with the tenant systems 110 or other components 131 of the host computing system 130.

Status information indicates an operating status of the component, which is used to determine whether a violation evaluation process should be conducted. For example status information indicates that a resource consumption violation has occurred at the component 131. In an example, the status information is determined by comparing one or more diagnostic information metrics against status thresholds.

The data storage unit 137 could store diagnostic information or status information associated with system components 131, for example, in one or more logs accessible to the components 131. Logging the diagnostic information or the status information may involve periodically or continuously logging the diagnostic information or the status information, for example, every five minutes or other appropriate time interval. Also, instead of or in addition to logging the log data in a data log accessible to the diagnostic subsystem 133, various system components 131 could provide the log data to the diagnostic subsystem 133 in response to receiving a status inquiry from the diagnostic subsystem 133, could push the log data to the diagnostic subsystem 133 without receiving a status inquiry from the diagnostic subsystem 133, or some combination thereof. An example of a data storage unit 137 includes a local or remote data storage structure accessible to the host computing system 130 suitable for storing information. A data storage unit can store relevant data as one or more databases, one or more matrices, etc. Also, in some embodiments, each of the system components 131 may log diagnostic information or status information in a respective data log. The diagnostic information or status information include statuses of the system components 131. The data log including the diagnostic information or status information is accessible to the diagnostic subsystem 133.

In some embodiments, the diagnostic subsystem 133 determines a suboptimal status or performance degradation of a component 131 by analyzing the diagnostic information or the status information obtained from the data log. For instance, the diagnostic subsystem 133 compares one or more metrics of the diagnostic information against a thresholds. In this example, the data storage unit 137 is accessible to the diagnostic subsystem 133 to retrieve the diagnostic information or status information logged by components 131 to use to determine resource consumption violations occurring on specific components 131. In some embodiments, the diagnostic subsystem 133 generates the status information by comparing one or more metrics from diagnostic information concerning the components 131 against thresholds. For instance, a resource consumption violation status could include a diagnostic metric that is greater than a threshold diagnostic metric. If the diagnostic information indicates that a processing speed, an amount of available memory, or other diagnostic metric of the component 131 is below a predetermined threshold, the diagnostic subsystem 133 determines that there has been a performance degradation of the component 131 or that the component 131 is operating a suboptimal status. In another example, the status information indicates a performance degradation of the component 131, for example, the status information states "not enough memory" and indicates a particular performance degradation or suboptimal status that is a lack of available memory for the component 131.

The diagnostic subsystem 133 notifies a rate limiting subsystem 135 of the presence of suboptimal status or performance degradation. In response to receiving this notification, the rate limiting subsystem 135 performs a violation evaluation process to identify a violator tenant system 110 that caused the suboptimal status or performance degradation of a component 131. An example of a violation evaluation process is described herein with respect to certain steps of FIG. 2. The rate limiting subsystem 135 also computes one or more rate limits to apply to one or more violator tenant systems that are identified via the violation evaluation process. Implementing the rate limit involves restricting or otherwise modifying processes or communications of the host computing system 130 with the specific tenant systems 110. In some embodiments, the rate limiting subsystem 135 stores rate limits determined for tenant systems 110 via the data storage unit 137. The stored rate limits are accessible by components 131 of the host computing system 130. One or more of the components 131 implement the stored rate limits with respect to rate limited tenant systems 110.

In some embodiments, the host computing system 130 stores, via the data storage unit 137, an incidence history of resource consumption violations associated with tenant systems 110 accessible by the rate limiting subsystem 135. The rate limiting subsystem 135 can compute or adjust a rate limit for a violator tenant system 110 based on the incidence history. For instance, the rate limiting subsystem 135 computes a more restrictive rate limit for a frequent violator tenant system 110 and a less restrictive rate limit for an infrequent violator tenant system 110. For example, a frequent violator tenant system 110 has been previously identified, according to the incidence history, to be a violator tenant system 110 greater than a threshold number of times, for example, three resource consumption violations. In this example, an infrequent violator tenant system 110 has been identified in the incidence history as a violator tenant system 110 less than the threshold number of times. The rate limiting subsystem 135 may implement a more restrictive rate limit against a frequent violator tenant system 110 by increasing the rate limit by a factor, multiplying the rate limit by a factor, increasing a timeframe for imposing the rate limit, or by other appropriate means to increase a restrictiveness of the rate limit as compared to a rate limit that would be imposed on an infrequent violator tenant system 110. In some embodiments, the rate limiting subsystem 135 implements the rate limit against a violator tenant system 110 by transmitting instructions to one or more of the system components 131 that cause the system components 131 to enforce the rate limit against the violator tenant system 110.

In the examples described herein, the diagnostic subsystem 133 and the rate limiting subsystem 135 are separate subsystems and are components of the host computing system 130. However, in some examples, the diagnostic subsystem 133 is a component or subsystem of the rate limiting subsystem 135, the rate limiting subsystem 135 is a component or subsystem of the diagnostic subsystem 133, or the functions of both the diagnostic subsystem 133 and the rate limiting subsystem 135 are performed by a combined subsystem within the host computing system 130. In some embodiments, one or more of the functions described herein as being performed by the diagnostic subsystem 133 and the rate limiting subsystem 135 are performed by one or more computing systems or computing devices that communicate with the host computing system 130 via the data network 120. In some embodiments, one or more of the system components 131 transmits alerts advising of one or more suboptimal statuses caused by resource consumption violations with respect to the system components 131 in response to the system components 131 detecting the suboptimal statuses. In other embodiments, the diagnostic subsystem 133 transmits requests to the components 131 for status information or diagnostic information and receives the status information or diagnostic information from the components 131. In yet another embodiment, the diagnostic subsystem 133 stores a central data log accessible to components 131. The components 131 can log status or diagnostic information. The diagnostic subsystem 133 accesses the central data log to determine diagnostic or status information for components 131.

One or more of the tenant systems 110 and the host computing system 130 could include a device having a communication module capable of transmitting and receiving data over a data network 120. For instance, one or more of the tenant systems 110 and the host computing system 130 could include a server, a desktop computer, a laptop computer, a tablet computer, a television with one or more processors embedded therein and/or coupled thereto, a smart phone, a handheld computer, or any other wired or wireless, processor-driven device. Examples of tenant systems 110 include user computing devices, service computing devices, service client applications, and other entities that communicate with a host computing system 130 via the data network 120. Examples of an online service that can be provided by a host computing system include a search engine, an online gaming service, a messaging service, etc.

Examples of the data network 120 include, but are not limited to, internet, local area network ("LAN"), wireless area network, wired area network, wide area network, and the like. For example, the data network 120 includes a wired or wireless telecommunication means by which network systems can communicate and exchange data. For example, each data network 120 can be implemented as, or may be a part of, a storage area network ("SAN"), a personal area network ("PAN"), a metropolitan area network ("MAN"), a LAN, a wide area network ("WAN"), a wireless LAN ("WLAN"), a virtual private network ("VPN"), an intranet, an Internet, a mobile telephone network, a card network, a Bluetooth network, a near field communication ("NFC") network, any form of standardized radio frequency, or any combination thereof, or any other appropriate architecture or system that facilitates communication of signals, data, and/or messages (generally referred to as data). It should be understood that the terms "data" and "information" are used interchangeably herein to refer to text, images, audio, video, or any other form of information that can exist in a computer-based environment.

Examples of Operations for Applying Rate Limits to Violator Tenant Systems

FIG. 2 depicts an example of a method 200 for applying a rate limit to a tenant system 110 impacting a status of a component 131 of an online service, according to certain embodiments. For illustrative purposes, the method 200 is described with reference to the components illustrated in FIG. 1, though other implementations are possible. For example, the program code for the rate limiting subsystem 135 and diagnostic subsystem 133, which is stored in a non-transitory computer-readable medium, is executed by one or more processing devices to cause the host computing system 130 to perform one or more operations described herein.

At block 210, the method 200 involves the host computing system 130 identifying a resource consumption violation with respect to a component 131, such as a memory resource, of a host computing system 130. The resource consumption violation decreases responsiveness of the online service during a particular time period. In some embodiments, a resource consumption violation includes a diagnostic metric that is greater than a threshold diagnostic metric. Examples of exceeding such a threshold diagnostic metric include a saturation of a database shard network component, an exceeded usage limit of a central processing unit component, an exceeded limit of memory exhaustion errors in instances in an online service component, an exceeded scaling limit for an online services component, and an exceeded usage of virus scanner threads in an online service component. The particular time period may be a predefined length of time used for diagnostic purposes (e.g., thirty seconds, two minutes, five minutes).

In some embodiments, the diagnostic subsystem 133 monitors a status of the components 131 for potential resource consumption violations. The diagnostic subsystem 133 communicates with the components 131 to obtain status information and/or diagnostic information. The diagnostic subsystem 133 determines that the resource consumption violation has occurred by comparing a diagnostic metric of the component 131 to a threshold diagnostic metric. For example, if the diagnostic information indicates that a diagnostic metric (for example, an amount of available memory, a processing speed, a rate of data transmission) of the component 131 is below a predetermined threshold, the diagnostic subsystem 133 determines that there has been a resource consumption violation. In another example, the status information indicates the resource consumption violation of the component 131, for example, the status information states "exceeded scaling limit" and indicates a resource consumption violation of an exceeded scaling limit for the component 131.

In additional or alternative embodiments, one or more of the components 131 determine that the resource violation has occurred. The component 131 may periodically determine diagnostic information of the component 131 (e.g. a processing speed of the component 131, an amount of available memory available to the component 131, etc.) and store the determined diagnostic information in the data log. The component 131 could monitor diagnostic information stored in a data log associated with the component 131 and detect the resource violation from this monitored diagnostic information by comparing diagnostic metrics of the monitored diagnostic information to thresholds. For example, if the diagnostic information indicates that a diagnostic metric (for example, an amount of available memory) of the component 131 is below a predetermined threshold, the diagnostic subsystem 133 determines that there has been a resource consumption violation (for example, the component 131 does not have enough available memory). In this example, in response to detecting a resource consumption violation, the component 131 transmits an alert to the rate limiting subsystem 135 and the rate limiting subsystem 135 receives the alert identifying the resource consumption violation.

At block 220, the method 200 involves the rate limiting subsystem 135 retrieving log data identifying tenant systems that accessed the memory resource during the particular time period. The log data identifies requests that have been serviced by one or more of the components 131, associated time stamps of the serviced requests, and identifiers of tenant systems 110 for which the requests were serviced. In some embodiments, the log data also includes a description of data that was accessed from a memory component, a size or quantity of data accessed from the memory component, or both. In one example, the rate limiting subsystem 135 retrieves this log data from a log of a component 131. In another example, the rate limiting subsystem 135 retrieves this log data from a central data log associated with the host computing system 130.

At block 230, the method 200 involves the rate limiting subsystem 135 determining, from the log data, that a violator tenant system accessing the online service caused the resource consumption violation. For instance, the rate limiting subsystem 135 performs a violation evaluation process at block 230. The violation evaluation process includes a set of operations that identify one or more violator tenant systems 110 that have caused or contributed to a suboptimal status of a component 131.

Another example of a violation evaluation process involves a component 131 that is a central processing unit ("CPU") and a resource consumption violation in which a usage limit of the CPU has been exceeded. In this example, the violation evaluation process includes identifying a violator tenant system having a larger contribution to a total number of queries not backed by indexes. For instance, certain harmful request patterns from tenant systems 110 may cause the usage limit of the CPU component to be exceeded. For example, a harmful request pattern of frequent queries that are not backed by an index of the database associated with the CPU component may result in an exceeded usage limit. Tenant systems 110 may cause a higher CPU load on database shards if the tenant systems submit queries that are not backed by an index, whereas a lower CPU load results from tenant systems 110 when submitting queries that are backed by an index. A query is backed by an index if, for example, the query is directed to a dataset that has been indexed, and the query is not backed by an index if the query is directed to a dataset that has not been indexed. The rate limiting subsystem 135 determines, from the log data, a total number of queries not backed by indexes returned in response to queries. In an example, a component 131 that is a CPU or other processing hardware logs query data that identifies queries received from tenant systems 110 and that indicates whether each query is backed by an index. The rate limiting subsystem 135 identifies the tenant system 110 having a larger contribution to the total number of queries not backed by an index. For instance, the rate limiting subsystem 135 could identify, from the log data, k violator tenant systems 110 having the k highest number of queries not backed by an index.

Another example of a violation evaluation process involves an online service component 131 and a suboptimal status, including an exceeded limit of memory exhaustion errors. In this example, the violation evaluation process includes identifying a violator tenant system having a larger contribution to a total number of application programming interface ("API") calls and/or to an amount of data retrieved from the online service. For instance, certain harmful request patterns that may cause a number of memory exhaustion errors to exceed a predetermined limit. An example of a harmful request pattern that could cause the number of memory exhaustion errors to exceed the predetermined limit is retrieving large amounts of data within multiple API calls on affected service containers. In a violation evaluation process, the rate limiting subsystem 135 determines a total number of API calls and a total amount of data retrieved from the online service over a time period based on diagnostic information retrieved from a log. In an example, the component 131 that is an online service or other hardware logs API call data that identifies API calls received from tenant systems 110 along with a total amount of data retrieved in each API call. In this example, the violation evaluation process includes identifying a violator tenant system having a larger contribution to a total number of API calls or to an amount of data retrieved from the online service. For instance, the rate limiting subsystem 135 could identify k violator tenant systems 110 having the k highest number of API calls. In another example, the rate limiting subsystem 135 could identify k violator tenant systems 110 having the k highest amount of data retrieved from the online service. In another example, the rate limiting subsystem 135 computes a composite ranking (e.g. an average of the two rankings, a weighted average ranking, etc.) to determine the violator tenant system 110 based on both criteria (the total number of API calls and the total amount of data retrieved). For instance, a composite ranking could be computed from an average or weighted average of a first ranking indicating a total number of API calls and a second ranking indicating a total amount of data retrieved. The rate limiting subsystem 135 could identify k violator tenant systems that have the k largest composite rankings.

Another example of a violation evaluation process involves an online service component 131 and a suboptimal status including an exceeded scaling limit. In this example, the violation evaluation process includes identifying a violator tenant system 110 having a larger contribution to a total number of requests to the online service. For instance, certain harmful request patterns that may cause an exceeded scaling limit for the online service component. For example, a single tenant system 110 performing an unusual number of requests compared to other tenant systems 110 is a harmful request pattern that may result in an exceeded scaling limit of an upstream cloud service and may cause the upstream cloud service to return an out of capacity error. The rate limiting subsystem 135 applies the violation evaluation process by determining a total number of requests from a data log associated with the online service component 131. For example, tenant system 110 having a larger contribution to the number of requests as compared to other tenant systems 110. For instance, the rate limiting subsystem 135 could identify k violator tenant systems that have the k largest numbers of requests during the particular time period in which the resource consumption violation occurred.

Another example of a violation evaluation process involves a virus scanning component 131 and a suboptimal status including an exceeded usage of virus scanner threads. In this example, the violation evaluation process includes identifying a total number of virus scanning requests over a time period. For instance, certain harmful request patterns that may cause an exceeded usage of virus scanner threads. A tenant system 110 submitting a high inflight request count of virus scanner threads is a harmful request pattern that may cause an exceeded usage of virus scanner threads. In some embodiments, the rate limiting subsystem 135 accesses a data log associated with the virus scanner component. In an example, the component 131 that is a virus scanner or other processing hardware logs query data including virus scanning queries received from tenant systems 110 including timestamp data indicating a time at which each virus scanning query is received and/or processed. The rate limiting subsystem 135 identifies a total number of virus scanning requests for the time period from the data log. The rate limiting subsystem 135 identifies a tenant system 110 having a larger contribution to the total number of virus scanning requests as compared to other tenant systems 110. For instance, the rate limiting subsystem 135 could identify k violator tenant systems that have the k largest numbers of virus scanning requests during the particular time period in which the resource consumption violation occurred.

At block 240, the method 200 involves the rate limiting subsystem 135 enforcing a rate limit against the violator tenant system rather than other tenant systems identified in the log data. Enforcing the rate limit reduces an ability of the violator tenant system to access the online service. An example of a rate limit is a maximum velocity of requests being serviced (i.e., a number of requests serviced per time period), a maximum amount of data delivered in response to a request, or other metric that the violator tenant system 110 may not exceed. Enforcing the rate limit involves rejecting or ignoring requests from a violator tenant system such that the rate limit is not exceeded. For instance, the host computing system 130 could enforce the rate limit by reducing a frequency with which requests from the violator tenant system are serviced, reducing an amount of data that may be communicated, or prohibiting particular types of requests during a subsequent time period as compared to a frequency with which requests from a non-violator tenant system are serviced during the same subsequent time period. In some embodiments, enforcing a rate limit involves blocking the violator tenant system from accessing the host computing system 130 altogether (i.e., rejecting or ignoring all requests from the violator tenant system) for a specified time period.

In some embodiments, the rate limiting subsystem 135 computes a rate limit according to diagnostic information of the component 131. For example, the rate limiting subsystem 135 determines a rate limit based on a distance between a diagnostic metric and threshold metric. The rate limiting subsystem 135 could determine a more restrictive rate limit for a violator tenant system 110 causing a diagnostic metric A that is farther below a threshold diagnostic metric than a violator tenant system 110 causing a diagnostic metric B that is not as far below the diagnostic threshold metric.

In some embodiments, the rate limiting subsystem 135 computes a rate limit according to a contribution to the status of the system component by the violator tenant system 110. In an example, the rate limiting subsystem 135 determines, from diagnostic data, that violator tenant system 110-1 is 75% responsible for the resource consumption violation and violator tenant system 110-2 is 25% responsible for the resource consumption violation. In this example, the rate limiting subsystem 135 computes a higher rate limit to apply against violator tenant system 110-1 and a lower rate limit to apply against violator tenant system 110-2 since violator tenant system 110-2 has a greater contribution to the resource consumption violation.

In some embodiments, the rate limiting subsystem 135 computes a rate limit according to whether a violator tenant system 110 is determined from a history of incidence of resource consumption violations as a frequent or infrequent violator. In an example, the rate limiting subsystem 135 imposes a more restrictive rate limit on a violator tenant system 110 that has a history of incidences of causing resource consumption violations at one or more components 131 and imposes a less restrictive rate limit on a violator tenant system 110 that does not have such a history. For example, a history of incidences means greater than a threshold number of historical resource consumption violations. The threshold number may be zero, one, five, or other appropriate number of historical resource consumption violations. The rate limiting subsystem 135 could identify all historical resource consumption violations of the violator tenant system 110 from the history. If the number of historical resource consumption violations associated with the violator tenant system 110 is greater than the threshold number, the rate limiting subsystem 135 applies a rate limit that is more restrictive than a rate limit that would be applied to a violator tenant system 110 having a number of historical resource consumption violations less than the threshold number.

In some embodiments, the rate limiting subsystem 135 computes a rate limit according to a degree of remedy required to mitigate the resource consumption violation of the component 131. For example, the rate limiting subsystem 135 calculates a degree of projected remedy to the status of the system component obtained by applying rate limits and selects a rate limit that results in a sufficient degree of projected remedy to resolve the resource consumption violation so that the component 131 is no longer operating at a suboptimal status. For example, the remedy involves restoring the component 131 to an optimal operating status by removing a saturation of a database shard, lowering a CPU usage, lessening a number of memory exhaustion errors in an online service, lowering a usage of virus scanner threads on a virus scanner components, or other appropriate remedy. In an example, the diagnostic subsystem 133 monitors diagnostic information and/or status information associated with the component 131 that indicates the resource consumption violation to verify that the resource violation consumption violation is remedied through applying the rate limit targeted against the violator tenant system 110. In certain examples, the diagnostic subsystem 133 determines, based on log data having diagnostic information and/or status information for the component 131, that the resource consumption violation is not remedied after applying the targeted rate limit against the violator tenant system 110. In these examples, the rate limiting subsystem 135 may modify the rate limit so that violator tenant system 110 is further restricted from communicating with the component 131 and/or host computing system 130 components.

In some embodiments, the rate limiting subsystem 135 decays enforcement of the rate limit over time. In one example, the rate limiting subsystem 135 selects a rate at which enforcement of the rate limit decreases over a certain time period. For instance, the rate limiting subsystem 135 could select a linear decrease in the enforcement over time, an exponential decrease over time, or some other rate at which enforcement decreases that is a function of time. The rate limiting subsystem 135 decreases enforcement of the rate limit at the selected rate over the time period. For instance, the rate limiting subsystem 135 could reject all requests from the violator tenant system at the start of the time period, reject 75% of the requests from the violator tenant system at the start of the time period during a first portion of the time period, reject 50% of the requests from the violator tenant system at the start of the time period during a second portion of the time period, and so on until the time period has elapsed and all requests from the violator tenant system are being serviced. Decaying enforcement of the rate limit over time can include transmitting instructions to one or more of the system components 131 that change how the system components 131 enforce the rate limit against the violator tenant system 110 (e.g., providing the system components 131 with updated rate limits over time, providing the system components 131 with instructions on how to update the rate limits over time, etc.).

In additional or alternative embodiments, the diagnostic subsystem 133 determines that a responsiveness or resource capacity of the online service or host computing system 130 has increased during an additional time period after the rate limit is applied against the violator tenant system 110. In this example, the rate limiting subsystem 135 iteratively adjusts enforcement of the rate limit against the violator tenant system to reflect changes in the responsiveness of the online service. For instance, the diagnostic subsystem 133 can determine that the responsiveness of the online service has increased (e.g., one or more resource consumption violations have ceased) during a time period in which an initial rate limit is enforced. The rate limiting subsystem 135 calculates, based on the increased responsiveness or resource capacity of the online service having increased, an adjusted rate limit that is different than the initial rate limit. The adjusted rate limit is less restrictive than the initial rate limit (e.g., allows a larger velocity of requests, a larger amount of returned data, etc.). The rate limiting subsystem 135 enforces the adjusted rate limit for a subsequent time period. If the responsiveness of the online service increases or is maintained in this subsequent time period, the rate limiting subsystem 135 could further adjust the rate limit to be less restrictive or remove the rate limit altogether.

In an example, an operator of the host computing system 130 configures one or more violation evaluation processes and associates each violation evaluation process with a component 131 and/or a resource consumption violation type. In an example, the host computing system 130 includes a database with violation evaluation process association data that associates violation evaluation processes with component 131 and/or resource consumption violation types. For example, for a host computing system 130 including five components 131-1, 131-2, 131-3, 131-4, and 131-5, example violation evaluation process association data includes "component 131-1, resource consumption violation type A, violation evaluation process 1; component 131-1, resource consumption violation type B, violation evaluation process 2; component 131-1, resource consumption violation type C, violation evaluation process 3; component 131-2, resource consumption violation G, violation evaluation process 4; component 131-2, resource consumption violation H, violation evaluation process 5; component 131-3, resource consumption violation K, violation evaluation process 6; component 131-4, resource consumption violation M, violation evaluation process 7; component 131-5, resource consumption violation X, violation evaluation process 8; component 131-5, resource consumption violation Y, violation evaluation process 9; component 131-5, resource consumption violation Z, violation evaluation process 10." Some components 131 may have different associated violation evaluation processes associated with respective different resource consumption violation types. Other components 131 may have a single violation evaluation process associated with the component. In this example, in response to the diagnostic subsystem 133 detecting a resource consumption violation, the rate limiting subsystem 135 identifies, from the database, the appropriate violation evaluation process associated with the affected component 131, type of resource consumption violation, or both.

Example of a Computing System for Implementing Certain Embodiments

Figure 3:
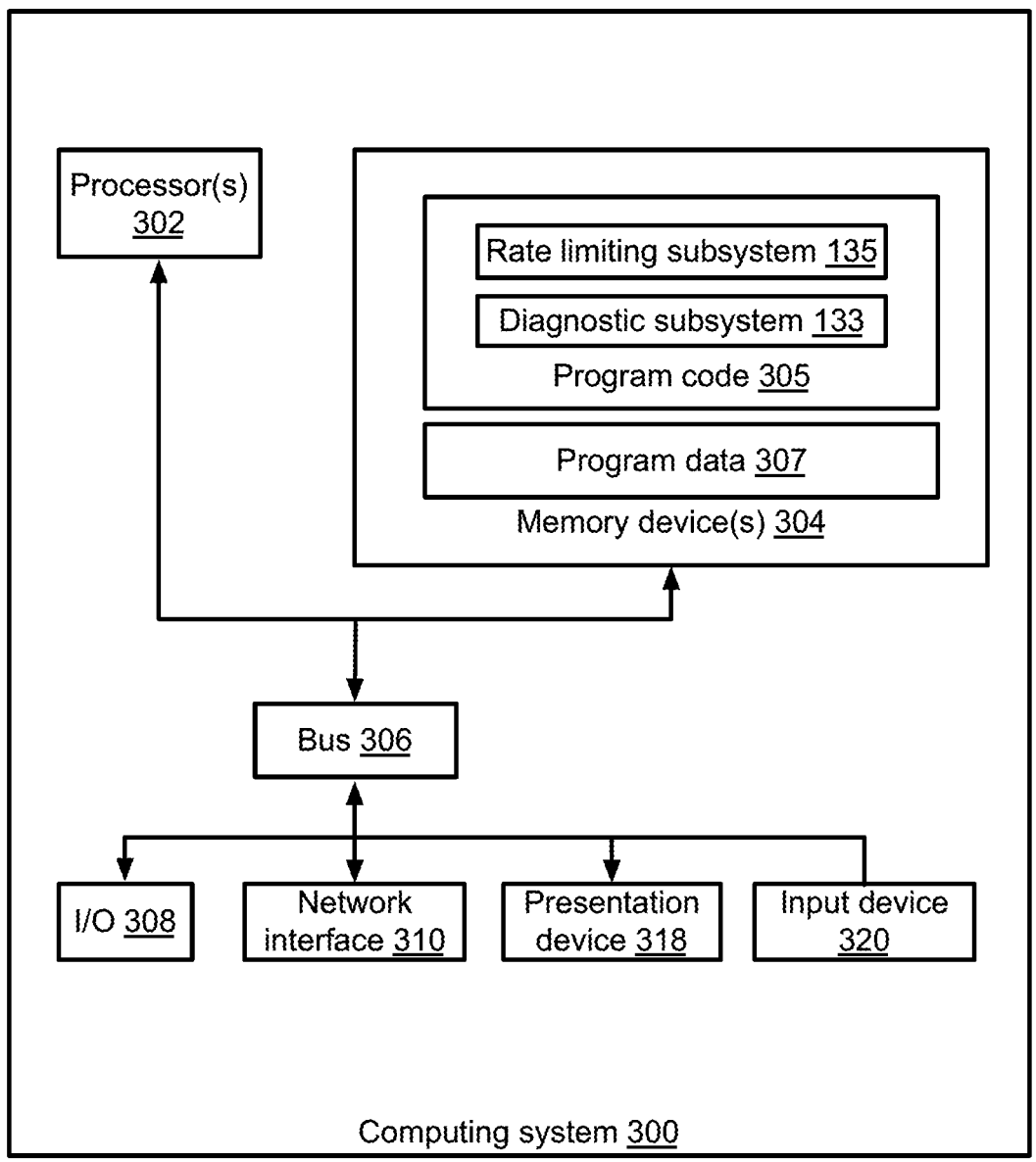
FIG. 3 depicts an example of a computing system that performs certain operations described herein, according to certain embodiments described in the present disclosure.

Any suitable computing system or group of computing systems can be used for performing the operations described herein. For example, FIG. 3 depicts an example of a computing system 300. The computing system 300 includes the diagnostic subsystem 133 and the rate limiting subsystem 135. In some embodiments, the computing system 300 also includes one or more components 131.

The depicted examples of a computing system 300 includes a processor 302 communicatively coupled to one or more memory devices 304. The processor 302 executes computer-executable program code stored in a memory device 304, accesses information stored in the memory device 304, or both. Examples of the processor 302 include a microprocessor, an application-specific integrated circuit ("ASIC"), a field-programmable gate array ("FPGA"), or any other suitable processing device. The processor 302 can include any number of processing devices, including a single processing device.

The memory device 304 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions.

The computing system 300 executes program code 305 that configures the processor 302 to perform one or more of the operations described herein. The program code 305 includes, for example, the diagnostic subsystem 133, the rate limiting subsystem 135, or other suitable applications that perform one or more operations described herein. The program code 305 may be resident in the memory device 304 or any suitable computer-readable medium and may be executed by the processor 302 or any other suitable processor. The program code could include processor-specific instructions generated by a compiler or an interpreter from code written in any suitable computer-programming language, including, for example, C, C++, C #, Visual Basic, Java, Python, Perl, JavaScript, and ActionScript.

In some embodiments, program code 305 for implementing both the diagnostic subsystem 133 and the rate limiting subsystem 135 are stored in the memory device 304, as depicted in FIG. 3. In additional or alternative embodiments, program code 305 for implementing one or more of the diagnostic subsystem 133 and the rate limiting subsystem 135 are stored in different memory devices of different computing systems. In additional or alternative embodiments, the program code 305 described above is stored in one or more other memory devices accessible via a data network.

The computing system 300 can access program data 307, which includes one or more of the datasets described herein (e.g., diagnostic data, status data of system components 131), in any suitable manner. In some embodiments, some or all of one or more of these data sets, models, and functions are stored as the program data 307 in the memory device 304, as in the example depicted in FIG. 3. In additional or alternative embodiments, one or more of these data sets, models, and functions are stored in the same memory device (e.g., one of the memory device 304). For example, a common computing system, such as the host computing system 130 depicted in FIG. 1, can include hardware, software, or both that implements the diagnostic subsystem 133 and the rate limiting subsystem 135. In additional or alternative embodiments, one or more of the programs, data sets, models, and functions described herein are stored in one or more other memory devices accessible via a data network.

The computing system 300 also includes a network interface device 310. The network interface device 310 includes any device or group of devices suitable for establishing a wired or wireless data connection to one or more data networks. Non-limiting examples of the network interface device 310 include an Ethernet network adapter, a modem, and the like. The computing system 300 is able to communicate with one or more other computing devices (e.g., computing device associated with tenant systems 110) via a data network using the network interface device 310.

The computing system 300 may also include a number of external or internal devices, such as input or output devices. For example, the computing system 300 is shown with one or more input/output ("I/O") interfaces 308. An I/O interface 308 can receive input from input devices or provide output to output devices. One or more buses 306 are also included in the computing system 300. The bus 306 communicatively couples one or more components of a respective one of the computing system 300.

In some embodiments, the computing system 300 also includes the input device 320 and the presentation device 318 depicted in FIG. 3. An input device 320 can include any device or group of devices suitable for receiving visual, auditory, or other suitable input that controls or affects the operations of the processor 302. Non-limiting examples of the input device 320 include a touchscreen, a mouse, a keyboard, a microphone, a separate mobile computing device, etc. A presentation device 318 can include any device or group of devices suitable for providing visual, auditory, or other suitable sensory output. Non-limiting examples of the presentation device 318 include a touchscreen, a monitor, a speaker, a separate mobile computing device, etc.

Although FIG. 3 depicts the input device 320 and the presentation device 318 as being local to the computing device that executes the program code 305, other implementations are possible. For instance, in some embodiments, one or more of the input device 320 and the presentation device 318 can include a remote client-computing device that communicates with the computing system 300 via the network interface device 310 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method that includes performing, with one or more processing devices, operations comprising:
   identifying a resource consumption violation with respect to a memory resource of a computing system hosting an online service, wherein the resource consumption violation decreased responsiveness of the online service during a particular time period;
   retrieving log data identifying tenant systems that accessed the memory resource during the particular time period;
   determining, from the log data, that a violator tenant system accessing the online service caused the resource consumption violation, wherein determining that the violator tenant system caused the resource consumption violation comprises identifying, from the log data for a set of tenant computing devices, the violator tenant system having a larger contribution, as compared to other tenant computing devices in the set, to an overall metric; and
   enforcing a rate limit against the violator tenant system that caused the resource consumption violation rather than against other tenant systems identified in the log data, wherein the rate limit reduces an ability of the violator tenant system to access the online service.

2. The method of claim 1, wherein enforcing the rate limit against the violator tenant system comprises:
   selecting a rate at which enforcement of the rate limit decreases over an additional time period; and
   decreasing the enforcement of the rate limit at the selected rate over the additional time period, wherein the enforcement of the rate limit ceases after the additional time period has elapsed.

3. The method of claim 1, further comprising:
   determining that the responsiveness of the online service has increased during an additional time period; and
   reducing enforcement of the rate limit against the violator tenant system based on the responsiveness of the online service having increased during the additional time period.

4. The method of claim 1, wherein enforcing the rate limit comprises reducing a frequency with which requests from the violator tenant system are serviced during a subsequent time period as compared to a frequency with which requests from a non-violator tenant system are serviced during the subsequent time period.

5. The method of claim 1, further comprising:
   determining, for the violator tenant system from the log data, the contribution to the overall metric associated with the violator tenant system; and
   computing the rate limit to be proportional to the contribution.

6. The method of claim 1, further comprising:
   identifying, for an additional violator tenant system, multiple historical resource consumption violations caused by the additional violator tenant system;
   computing, based on identifying the multiple historical resource consumption violations, an additional rate limit that is greater than the rate limit; and
   enforcing the additional rate limit against the additional violator tenant system.

7. The method of claim 1, wherein the overall metric comprises one or more of:
   a total number of queries causing saturation of database shard;
   a total number of queries not backed by indexes causing a central processing unit component to exceed a threshold usage;
   a number of API calls to the online service and to an amount of data retrieved from the online service, the number of API calls and the amount of data retrieved causing a threshold number of memory exhaustion errors; or
   a total number of virus scanning requests causing a virus scanner component to exceed a threshold number of available virus scanner threads.

8. The method of claim 1, wherein the resource consumption violation comprises the responsiveness being less than a threshold responsiveness and further comprising:
   determining, after an additional time period, that the responsiveness of the online service has remained below the threshold responsiveness;
   identifying an additional violator tenant system that caused the resource consumption violation based on the log data; and
   enforcing an additional rate limit against the additional violator tenant system.

9. A computing system, comprising:
   processing hardware; and
   a non-transitory computer-readable medium communicatively coupled to the processing hardware,
   wherein the processing hardware is configured for executing instructions stored in the non-transitory computer-readable medium and thereby performing operations comprising:

identifying a resource consumption violation with respect to a memory resource of a host system hosting an online service, wherein the resource consumption violation decreased responsiveness of the online service during a particular time period;

retrieving log data identifying tenant systems that accessed the memory resource during the particular time period;

determining, from the log data, that a violator tenant system accessing the online service caused the resource consumption violation, wherein determining that the violator tenant system caused the resource consumption violation comprises identifying, from the log data for a set of tenant computing devices, the violator tenant system having a larger contribution, as compared to other tenant computing devices in the set, to an overall metric; and enforcing a rate limit against the violator tenant system that caused the resource consumption violation rather than against other tenant systems identified in the log data, wherein the rate limit reduces an ability of the violator tenant system to access the online service.

10. The computing system of claim 9, the operations further comprising:

determining that the responsiveness of the online service has increased during an additional time period; and reducing enforcement of the rate limit against the violator tenant system based on the responsiveness of the online service having increased during the additional time period.

11. The computing system of claim 9, the operations further comprising calculating, based on the log data, a determined period of time, wherein enforcing the rate limit against the violator tenant system comprises enforcing the rate limit for the determined period of time.

12. The computing system of claim 9, wherein enforcing the rate limit comprises reducing a frequency with which requests from the violator tenant system are serviced during a subsequent time period as compared to a frequency with which requests from a non-violator tenant system are serviced during the subsequent time period.

13. The computing system of claim 9, the operations further comprising:

determining, for the violator tenant system, a contribution to the overall metric; and computing the rate limit to be proportional to the contribution.

14. The computing system of claim 9, the operations further comprising:

identifying, for an additional violator tenant system, multiple historical resource consumption violations caused by the additional violator tenant system;

computing, based on identifying the multiple historical resource consumption violations, an additional rate limit that is greater than the rate limit; and enforcing the additional rate limit against the additional violator tenant system.

15. The computing system of claim 9, wherein the overall metric comprises one or more of:

a total number of queries causing saturation of database shard;

a total number of queries not backed by indexes causing a central processing unit component to exceed a threshold usage;

a number of API calls to the online service and to an amount of data retrieved from the online service, the number of API calls and the amount of data retrieved causing a threshold number of memory exhaustion errors; or a total number of virus scanning requests causing a virus scanner component to exceed a threshold number of available virus scanner threads.

16. The computing system of claim 9, wherein the resource consumption violation comprises the responsiveness being less than a threshold responsiveness and the operations further comprise:

determining, after an additional time period, that the responsiveness of the online service has remained below the threshold responsiveness;

identifying an additional violator tenant system that caused the resource consumption violation based on the log data; and enforcing an additional rate limit against the additional violator tenant system.

17. A non-transitory computer-readable medium having instructions stored thereon, the instructions executable by a processing device to perform operations comprising:

identifying a resource consumption violation with respect to a computing system hosting an online service, wherein the resource consumption violation decreased responsiveness of the online service during a particular time period;

retrieving log data identifying tenant systems that accessed the online service during the particular time period;

determining, from the log data, that a violator tenant system accessing the online service caused the resource consumption violation, wherein determining that the violator tenant system caused the resource consumption violation comprises identifying, from the log data for a set of tenant computing devices, the violator tenant system having a larger contribution, as compared to other tenant computing devices in the set, to an overall metric;

enforcing a rate limit against the violator tenant system that caused the resource consumption violation rather than against other tenant systems identified in the log data, wherein the rate limit reduces an ability of the violator tenant system to access the online service;

determining, after an additional time period, that the responsiveness of the online service has remained below a threshold responsiveness;

identifying an additional violator tenant system that caused the resource consumption violation based on the log data; and enforcing an additional rate limit against the additional violator tenant system rather than other tenant systems.

18. The non-transitory computer-readable medium of claim 17, the operations further comprising:

determining that the responsiveness of the online service has increased during an additional time period; and reducing enforcement of the rate limit against the violator tenant system that caused the resource consumption violation based on the responsiveness of the online service having increased during the additional time period.

19. The non-transitory computer-readable medium of claim 17, the operations further comprising:

determining, for the violator tenant system that caused the resource consumption violation, a contribution to the overall metric; and computing the rate limit to be proportional to the contribution.

20. The non-transitory computer-readable medium of claim 17, wherein the overall metric comprises one or more of:
- a total number of queries causing saturation of database shard;
- a total number of queries not backed by indexes causing a central processing unit component to exceed a threshold usage;
- a number of API calls to the online service and to an amount of data retrieved from the online service, the number of API calls and the amount of data retrieved that caused a threshold number of memory exhaustion errors; or
- a total number of virus scanning requests causing a virus scanner component to exceed a threshold number of available virus scanner threads.

* * * * *